United States Patent
Koestler et al.

(10) Patent No.: US 10,093,258 B2
(45) Date of Patent: Oct. 9, 2018

(54) ARRANGEMENT FOR ABSORBING KINETIC ENERGY

(71) Applicant: Bayerische Motoren Werke Aktiengesellschaft, Munich (DE)

(72) Inventors: Ulrich Koestler, Hebertshausen (DE); Arne Koehler, Pliening (DE); Wilhelm Riedl, Pfaffenhofen (DE); Tim Rudolph, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 66 days.

(21) Appl. No.: 15/271,325

(22) Filed: Sep. 21, 2016

(65) Prior Publication Data
US 2017/0008472 A1   Jan. 12, 2017

Related U.S. Application Data

(63) Continuation of application No. PCT/EP2015/056103, filed on Mar. 23, 2015.

(30) Foreign Application Priority Data

Mar. 24, 2014  (DE) .......................... 10 2014 205 412

(51) Int. Cl.
*B60R 19/40* (2006.01)
*B60R 21/34* (2011.01)
(Continued)

(52) U.S. Cl.
CPC .............. *B60R 19/40* (2013.01); *B60R 19/18* (2013.01); *B60R 19/26* (2013.01); *B60R 21/34* (2013.01);
(Continued)

(58) Field of Classification Search
CPC .......... B60R 19/38; B60R 19/40; B60R 21/34
(Continued)

(56) References Cited

U.S. PATENT DOCUMENTS 5,967,573 A * 10/1999 Wang ...................... B60R 19/40
                                                                    293/118
6,050,624 A *  4/2000 Kim ......................... B60R 19/28
                                                                    293/132
(Continued)

FOREIGN PATENT DOCUMENTS

DE         102 57 262 A1    6/2004
DE         102 59 428 A1    7/2004
(Continued)

OTHER PUBLICATIONS

International Search Report (PCT/ISA/210) issued in PCT Application No. PCT/EP2015/056103 dated May 19, 2015 with English translation (five pages).
(Continued)

*Primary Examiner* — Jason S Morrow
(74) *Attorney, Agent, or Firm* — Crowell & Moring LLP

(57) ABSTRACT

An arrangement for absorbing kinetic energy acting on a front bumper of a vehicle, in particular a motor vehicle, includes at least one pedestrian protection element which can be arranged on a cross member of the bumper, at least one absorption element which can be arranged on the cross member and is movable on the cross member in the longitudinal direction of the vehicle relative to the cross member between a front absorption position and a rear release position, and at least one locking device which can be arranged on the cross member by which the absorption element can be temporarily arrested in the absorption position thereof. The absorption element, in the absorption position thereof, is switched parallel to the pedestrian pro-
(Continued)

tection element in respect of a force initiated by the kinetic energy into the bumper.

17 Claims, 4 Drawing Sheets

(51) Int. Cl.
*B60R 19/18* (2006.01)
*B60R 19/26* (2006.01)

(52) U.S. Cl.
CPC . *B60R 2019/186* (2013.01); *B60R 2019/1873* (2013.01); *B60R 2019/262* (2013.01)

(58) Field of Classification Search
USPC .................................. 296/187.04; 293/4, 118
See application file for complete search history.

(56) References Cited

U.S. PATENT DOCUMENTS

| | | | | |
|---|---|---|---|---|
| 8,246,091 | B1* | 8/2012 | Jayasuriya | B60R 19/36 180/274 |
| 8,267,445 | B1* | 9/2012 | Jayasuriya | B60R 19/26 180/274 |
| 8,950,800 | B1* | 2/2015 | Farooq | B60R 21/34 293/118 |
| 9,102,290 | B1* | 8/2015 | Cuddihy | B60R 19/023 |
| 9,592,780 | B2* | 3/2017 | Wendel | B60R 19/26 |
| 2008/0048461 | A1* | 2/2008 | Jayasuriya | B60R 19/40 293/119 |
| 2009/0079258 | A1 | 3/2009 | Tsuruhara et al. | |
| 2009/0152880 | A1* | 6/2009 | Donovan | B60R 19/40 293/4 |
| 2009/0242308 | A1* | 10/2009 | Kitte | B60R 21/36 180/271 |
| 2009/0289471 | A1* | 11/2009 | Finney | B60R 19/40 296/187.04 |
| 2012/0323447 | A1 | 12/2012 | Niesse et al. | |
| 2014/0174842 | A1* | 6/2014 | Kim | B60R 21/34 180/274 |
| 2015/0151700 | A1* | 6/2015 | Revankar | B60R 19/40 293/102 |
| 2017/0282823 | A1* | 10/2017 | Akif | B60R 19/26 |

FOREIGN PATENT DOCUMENTS

| | | |
|---|---|---|
| DE | 10 2005 021 725 A1 | 11/2006 |
| DE | 10 2008 048 647 A1 | 4/2009 |
| DE | 10 2008 048 678 A1 | 3/2010 |
| DE | 10 2010 054 639 A1 | 6/2012 |

OTHER PUBLICATIONS

German-language Written Opinion (PCT/ISA/237) issued in PCT Application No. PCT/EP2015/056103 dated May 19, 2015 (six pages).

German Search Report issued in counterpart German Application No. 10 2014 205 412.5 dated Dec. 3, 2014 with partial English translation (13 pages).

Chinese-language Office Action issued in counterpart Chinese Application No. 201580016222.5 dated Dec. 8, 2017 with English translation (14 pages).

\* cited by examiner

ARRANGEMENT FOR ABSORBING KINETIC ENERGY

CROSS REFERENCE TO RELATED APPLICATIONS

This application is a continuation of PCT International Application No. PCT/EP2015/056103, filed Mar. 23, 2015, which claims priority under 35 U.S.C. § 119 from German Patent Application No. 10 2014 205 412.5, filed Mar. 24, 2014, the entire disclosures of which are herein expressly incorporated by reference.

BACKGROUND AND SUMMARY OF THE INVENTION

The invention relates to an arrangement for absorbing kinetic energy acting on a front bumper of a vehicle, in particular a motor vehicle.

Furthermore, the invention relates to a bumper system for a vehicle, in particular a motor vehicle, having at least one bumper that is arrangeable on the front of the vehicle and includes across member.

The German laid-open specification DE 10 2008 048 647 A1 discloses a device for absorbing kinetic energy for installation in a front region of a motor vehicle. The device includes a stationary component and a component that is movable relative to the stationary component. The two components can be connected together via a coupling device such that when the coupling device is not active, the two components are movable relative to one another substantially without or with only a little enemy conversion, and such that when the coupling device is active, the forces are transferred from one component to the other. Starting from a predetermined force level, one of the two components plastically deforms deliberately. The two components are connected in series with one another with regard to introduction of force into the device.

The document US 2012/0323447 A1 relates to a bumper arrangement for a vehicle, including a cross member with crash boxes and a pedestrian protection element arranged on the cross member. The pedestrian protection element is less rigid than the cross member. Arranged in the pedestrian protection element is a deformation element which can be retracted into the cross member in the event of an accident involving a pedestrian, such that only the pedestrian protection element brings about a damping effect. In the event of an accident involving relatively large amounts of kinetic energy, the deformation element can be connected rigidly to the cross member, with the result that the deformation path available is extended. The pedestrian protection element is, in this case, connected in parallel with the deformation element with regard to introduction of force into the bumper arrangement.

The German laid-open specification DE 10 2005 021 725 A1 discloses a safety component for a motor vehicle, wherein the safety component is displaceable between a home position and a collision position by means of a displacement device. A sensor device is provided, by which an imminent collision of the vehicle and/or a collision of the vehicle that has occurred is detectable. A plurality of collision algorithms are stored in a control device, these being selectively activatable depending on collision parameters for displacing the safety component into a predetermined collision position.

It is the object of the invention to provide a variable, space-saving and effective arrangement for absorbing kinetic energy in the event of a collision of a vehicle.

This and other objects are achieved according to the invention, an arrangement, as well as a bumper system, for absorbing kinetic energy acting on a front bumper of a vehicle, in particular a motor vehicle, having:

at least one pedestrian protection element that is arrangeable on a cross member of the bumper, at least one absorption element that is arrangeable on the cross member and is arrangeable on the cross member so as to be movable in the longitudinal direction of the vehicle relative to the cross member between a front absorption position and a rear release position, and at least one locking device which is arrangeable on the cross member and by which the absorption element is temporarily lockable in its absorption position, wherein, in its absorption position, the absorption element is connected in parallel with the pedestrian protection element with regard to introduction of force into the bumper that is brought about by the kinetic energy.

As a result of the at least one absorption element being connected according to the invention in parallel with the pedestrian protection element with regard to introduction of force into the bumper that is brought about by the kinetic energy, the arrangement according to the invention can be configured in a space-saving manner order to save installation space. This has an advantageous effect in particular on the degree of freedom in the design of a vehicle equipped with an arrangement according to the invention.

The arrangement according to the invention can also have two or more pedestrian protection elements that are arrangeable on the cross member of the bumper. In addition, the arrangement according to the invention can have two or more absorption elements that are arrangeable on the cross member and are each arrangeable on the cross member so as to be movable in the longitudinal direction of the vehicle relative to the cross member between a front absorption position and a rear release position. Moreover, the arrangement according to the invention can also have two or more locking devices.

As a result of the absorption element being temporarily locked in its absorption position by way of the locking device that is arrangeable on the cross member, in the event of a collision of a vehicle equipped with the arrangement according to the invention, variable and effective absorption of kinetic energy can occur. In particular, the locking of the absorption element in its absorption position can be triggered in the event of a foreseeable or occurring collision of the vehicle with a pedestrian, such that the absorption element can be displaced substantially freely into the rear release position. This has the effect that force is not transferred to a pedestrian by the absorption element but only via the pedestrian protection element. By contrast, in its absorption position, the absorption element can be locked by way of the locking device in the event of a foreseeable or occurring collision of the vehicle with a further vehicle or some other object, such that force transfer between the vehicles colliding with one another or between the vehicle and the object takes place substantially via the absorption element and, to a much lesser extent, also via the pedestrian protection element. The arrangement thus meets preexisting pedestrian protection requirements.

The locking device can have at least one locking element and an actuable actuator unit interacting therewith. The actuator unit can have, for example, an actuator, a solenoid, an electric motor with a spring, a hydraulic unit, a pneumatic unit or the like.

The absorption element can be formed partially or completely from metal or an, in particular fiber-reinforced, composite material.

According to an advantageous configuration, the absorption element is less rigid than the cross member at least in the direction of the in of force. Preferably, an assembly formed by the absorption element and the pedestrian protection element is also less rigid than the cross member. As a result, in the event of a collision with another vehicle or some other object, with the absorption element locked in its absorption position, first of all plastic deformation of the absorption element occurs. It is only upon further introduction of force that plastic deformation of the cross member or components of the vehicle or of the bumper that are connected downstream thereof with regard to the introduction of force can occur. In the event of an anticipated pedestrian impact, the absorption element is not locked in its absorption position, with the result that the absorption element is displaced in the direction of its rest position and is not deformed. In this case, only the pedestrian protection element is deformed.

According to a further advantageous configuration, the arrangement includes at least two absorption elements, wherein at least one absorption element is arranged above the pedestrian protection element and at least one further absorption element is arranged beneath the pedestrian protection element. As a result of this arrangement of the absorption elements, forces that occur in the event of a collision with another vehicle or some other object can, with the absorption element locked in its absorption position, be absorbed optimally by the arrangement in order to largely prevent plastic deformation of components connected downstream of the absorption elements with regard to the introduction of three. This effect is enhanced with an increasing number of absorption elements present. In the event of an anticipated pedestrian impact, the absorption elements are not locked in their absorption positions, with the result that the absorption elements are displaced in the direction of their rest positions and are not deformed. In this case, only the pedestrian protection element is deformed.

In a further advantageous configuration, the arrangement includes at least two absorption elements, wherein at least one absorption element is arranged over or under the pedestrian protection element and at least one further absorption element is arrangeable in the region of an attachment of the cross member to a further component of the vehicle or of the bumper. It is also possible for there to be at least three absorption elements, of which at least one is arrangeable above the pedestrian protection element, at least one is arrangeable beneath the pedestrian protection element and at least one is arrangeable in the region of an attachment of the cross member to a further component of the vehicle or of the bumper. In each case at least one absorption element can also be arranged in the region of each attachment of the cross member to, in each case, one further component of the vehicle or of the bumper. The absorption element that is arrangeable in the region of an attachment of the cross member to a further component of the vehicle or of the bumper can be configured for example in the form of a bolt.

It is furthermore considered to be advantageous when the pedestrian protection element is formed at least partially from foam material. Alternatively, the pedestrian protection element can be formed at least partially from an elastomer or the like.

Also proposed according to the invention is a bumper system for a vehicle, in particular a motor vehicle, having at least one bumper that is arrangeable on the front of the vehicle and includes across member, characterized by at least one arrangement according to one of the abovementioned configurations or any desired combination thereof. The advantages mentioned above with regard to the arrangement are associated with this bumper system in a corresponding manner.

According to an advantageous configuration, the bumper system includes at least one electronic controller via which the locking device is actuable, wherein the electronic controller is set up to lock or unlock the locking device depending on a speed of the vehicle and detection by a sensor of an obstacle arranged in front of the vehicle. The electronic controller can be configured as a separate unit or be formed by an electronic device already present on the vehicle. The detection by a sensor of an obstacle present in front of the vehicle can take place by use of a suitable sensor device, for example a distance sensor system in the form of a distance radar, parking sensors, a stereo camera or the like. The sensor device can be part of the bumper system or already be present on a vehicle.

According to a further advantageous configuration, the electronic controller is set up to transfer the locking device exclusively from a release state in which the absorption element is not locked in its absorption position into a locking state in which the absorption element is locked in its absorption position when:

the vehicle is in the parked state, the vehicle is in the speed range of 0 km/h to 20 km/h when first started, the vehicle has reverse gear engaged or is idling, subsequently as when first started, the vehicle is moving at a speed in the range of 0 km/h to 20 km/h and at the same time an obstacle is detected in front of the vehicle, the vehicle is moving at a speed in the range of 55 km/h to 80 km/h and at the same time an obstacle is detected in front of the vehicle, and/or the vehicle is moving at a speed in the range of 80 km/h to the maximum vehicle speed.

As a result, pedestrian protection requirements are met and at the same time a bumper system is provided which is adaptable to different load situations. In addition, the locking device is accordingly in its inactive release state in city traffic and on a highway and is activated only in order to establish its locking state, this being associated with as few load changes as possible over the lifetime of the locking device. As a result, the bumper system is configured to be fail-safe with regard to the pedestrian protection requirements. Since the locking device is in its locking state in the parked state of the vehicle, even parking knocks by other vehicles can be absorbed via the absorption element. Since the locking device is in the locking state when the vehicle is moving, at a speed in the range of 0 km/h to 20 km/h and at the same time an obstacle is detected in front of the vehicle, the absorption element can additionally remain locked in the absorption position adopted in the parked state during stop-start driving and is thus subjected to a smaller number of load changes. Alternatively, the locking device can be transferred into its locking state by way of the electronic controller when the vehicle is moving at a speed in the range of 55 km/h to 80 km/h and an obstacle is detected in front of the vehicle, whereas the locking device is still in its locking state at a speed of about 80 km/h even without an obstacle being detected in front of the vehicle. Furthermore, unlocking of the locking device can be advantageous if the vehicle drops below 55 km/h; this would be associated with less actuation of the locking device and thus with fewer load changes.

In a further advantageous configuration, the electronic controller is set up to detect the state of the locking device. It is in particular possible, by means of the electronic controller, to detect whether the locking device is in its locking state or in its release state. The detection of the particular state of the locking device makes it possible to identify malfunctions. The detection of the particular state of the locking device can take place via a switch, via current identification or the like. As a result, the bumper system is capable of diagnosis, meaning that even a cable break can be detected and, for example, displayed via a display.

Advantageously, the bumper system has at least two deformation elements via which the cross member is connected to further components of the vehicle. The deformation elements can be configured as crash boxes and connect the cross member to engine side members.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
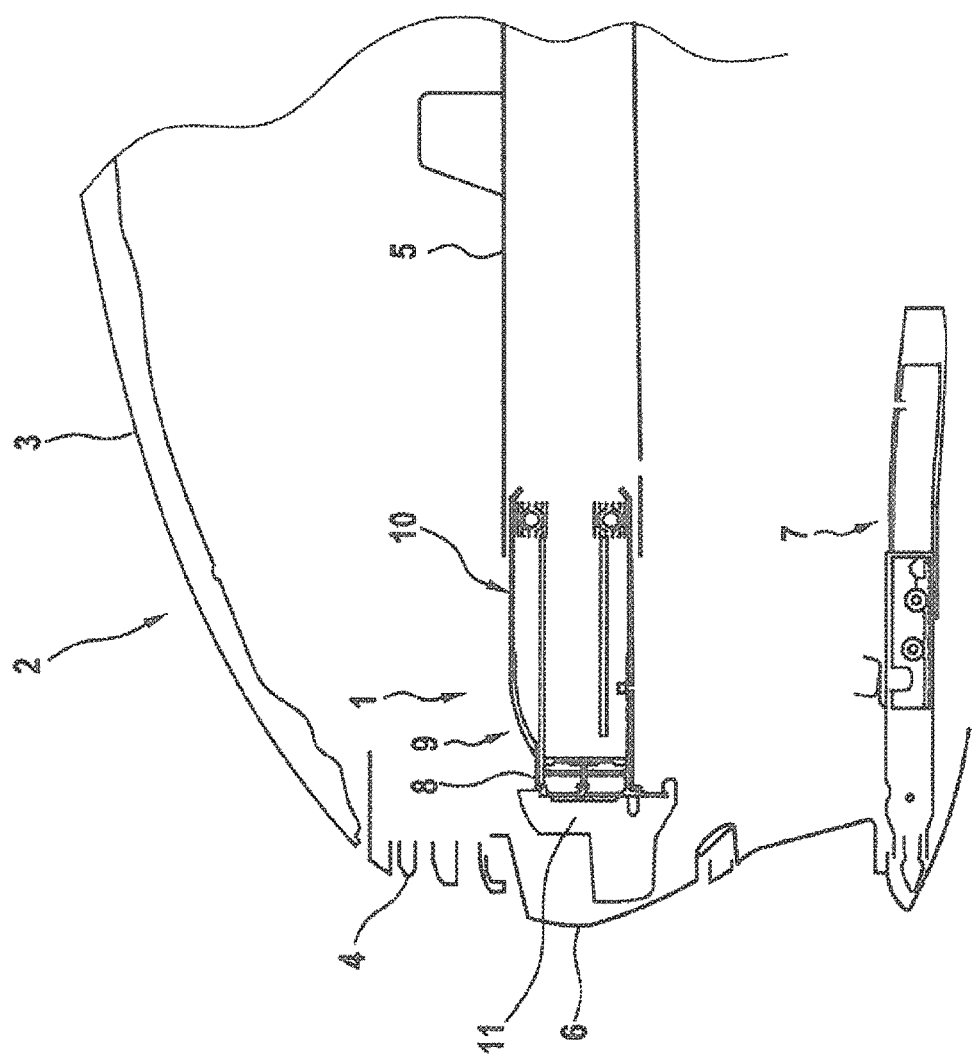
FIG. 1 is a schematic sectional illustration of a vehicle equipped with a conventional bumper system.

FIG. 1 shows a schematic sectional illustration of a detail of a vehicle 2 equipped with a conventional bumper system 1. A hood 3, a radiator grille 4, an engine side member 5 and a bumper cover 6 of the vehicle 2 are illustrated. A separate pedestrian protection device 7, the functioning of which is known and of no further significance for the invention, can be seen in the lower region of the vehicle 2. Such a pedestrian protection device 7 has a deformation element, via which, in the event of an accident, forces that are absorbed at points by the deformation element can be transferred into a downstream crash box. In this case, the deformation element is arranged so as to be displaceable deliberately relative to the crash box in order to form the pedestrian protection. In the event of an accident, with such deliberate displacement of the deformation element, tilting of the deformation element relative to a guide device provided for displacing the deformation element, for example the crash box or a guide receptacle arranged thereon, can occur, such that deliberate displacement of the deformation element is no longer possible.

The bumper system 1 includes a front bumper 9 that is arranged on the front of the vehicle 2 and includes across member 8. Furthermore, the bumper system 1 includes two deformation elements 10, of which only one deformation element 10 is illustrated in FIG. 1 and via which the cross member 8 is connected to the engine side members 5 of the vehicle 2. A pedestrian protection element 11 is arranged on the cross member 8.

Figure 2:
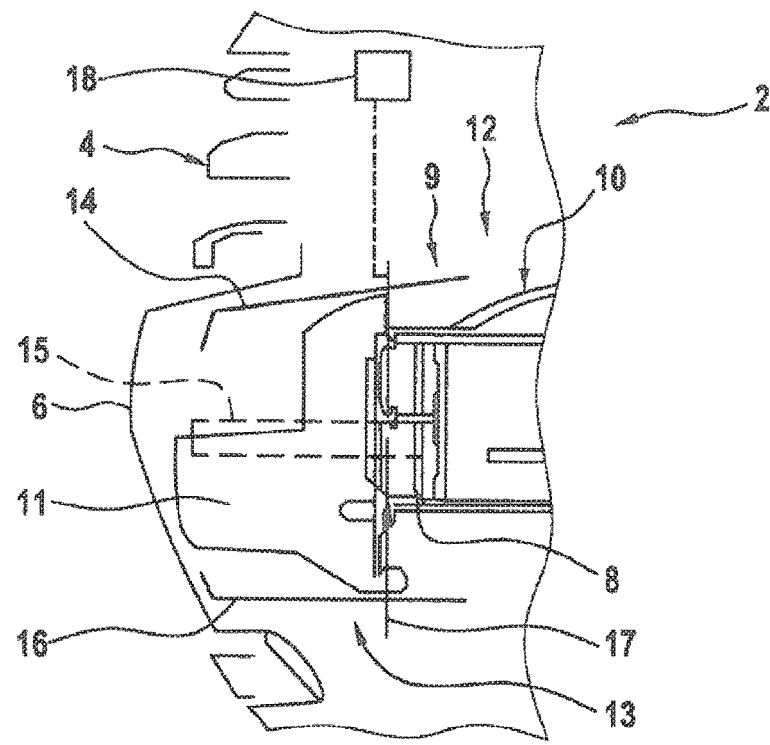
FIG. 2 is a schematic sectional illustration of a vehicle equipped with an exemplary embodiment of a bumper system according to the invention.

FIG. 2 shows a schematic sectional illustration of a vehicle 2 equipped with an exemplary embodiment of a bumper system 12 according to the invention. The bumper system 12 includes a front bumper 9 that is arranged on the front of the vehicle 2 and includes a cross member 8, and an arrangement 13 for absorbing kinetic energy acting on the front bumper 9. Furthermore, the bumper system 12 includes two deformation elements 10, of which only one deformation element 10 is illustrated in FIG. 2 and via which the cross member 8 is connected to the engine side members 5 (not shown in FIG. 2) of the vehicle 2.

The arrangement 13 includes a pedestrian protection element 11 arranged on the cross member 8. Furthermore, the arrangement 13 includes four absorption elements 14, 15 and 16 that are arranged on the cross member 8. Each is arranged on the cross member 8 so as to be movable in the longitudinal direction of the vehicle 2 relative to the cross member 8 between a front absorption position shown in FIG. 2 and urea/ release position. There are two absorption elements 15 that are formed identically in the form of a bolt, of which only one absorption element 15 is illustrated in FIG. 2. The absorption elements 15 are optional and therefore illustrated by dashed lines. The absorption element 14 is arranged above the pedestrian protection element 11, the absorption element 16 is arranged beneath the pedestrian protection element 11 and the absorption elements 15 are each arranged in the region of an attachment of the cross member 8 to a deformation element 10. The absorption elements 14, 15 and 16 are less rigid than the cross member 8 at least in the direction of the introduction of force.

The arrangement 13 furthermore includes two locking devices 17 indicated by a line which are arranged on the cross member 8 and by which the absorption elements 14, 15 and 16 are temporarily lockable in their absorption positions shown in FIG. 2 (only one locking device 17 being shown in FIG. 2). FIG. 2 furthermore shows that, in their absorption positions, the absorption elements 14, 15 and 16 are connected in parallel with the pedestrian protection element with regard to an introduction of force into the bumper 9 that is brought about by the kinetic energy.

The bumper system 12 furthermore includes an electronic controller 18, via which the locking devices 17 are actuable, wherein the electronic controller 18 is set up to lock or unlock the locking devices 17 depending on a speed of the vehicle 2 and detection by a sensor of an obstacle arranged in front of the vehicle 2. Furthermore, the electronic controller 18 is set up to transfer the locking devices 17 exclusively from a release state in which the absorption elements 14, 15 and 16 are not locked in their absorption positions into a locking state in which the absorption elements 14, 15 and 16 are locked in their absorption positions when:

the vehicle 2 is in the parked state, the vehicle 2 is in the speed range of 0 km/h to 20 km/h when first started, the vehicle 2 has reverse gear engaged or is idling, subsequently as when first started, the vehicle 2 is moving at a speed in the range of 0 km/h to 20 km/h and at the same time an obstacle is detected in front of the vehicle 2, and/or the vehicle 2 is moving at a speed in the range of 55 km/h to 80 km/h and at the same time an obstacle is detected in front of the vehicle 2, and/or the vehicle 2 is moving at a speed in the range of 80 km/h to the maximum vehicle speed.

Furthermore, the electronic controller 18 is set up to detect the states of the locking devices 17.

Figure 3:
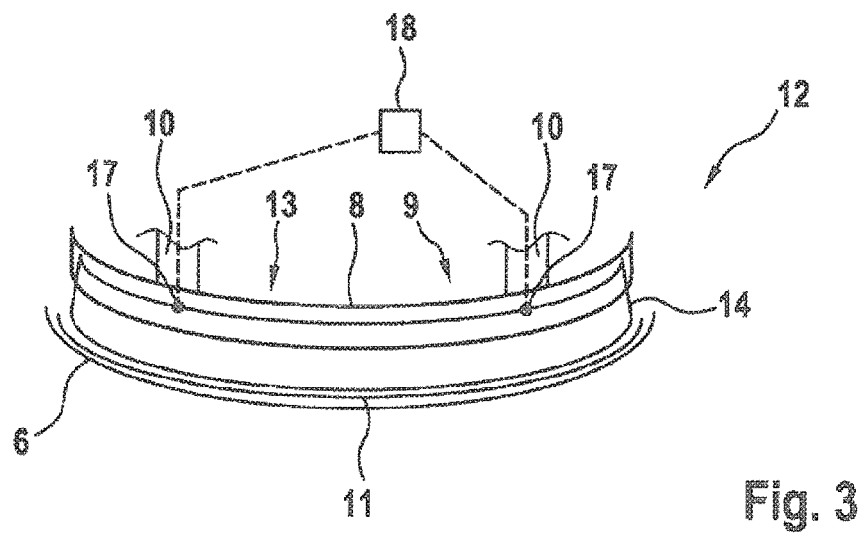
FIG. 3 is a schematic plan view of an exemplary embodiment of a bumper system according to the invention.

FIG. 3 shows a schematic plan view of an exemplary embodiment of a. bumper system 12 according to the invention, which can be configured as per the bumper system 12 shown in FIG. 2.

Figure 4:
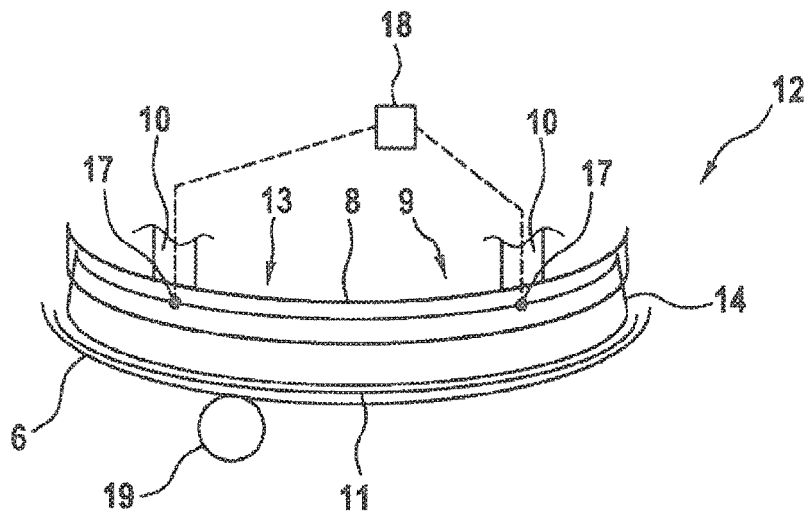
FIG. 4 is a schematic plan view of the exemplary embodiment shown in FIG. 3 immediately before a collision with a pedestrian.

FIG. 4 shows a schematic plan view of the exemplary embodiment shown in FIG. 3 immediately before a collision with a pedestrian, of whom only one leg 19 is indicated in FIG. 4. The locking devices 17 are in their release states.

Figure 5:
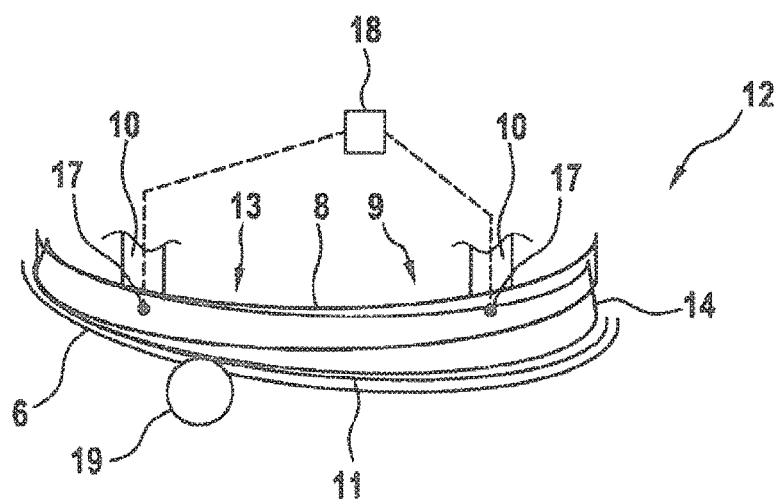
FIG. 5 is a schematic plan view of the exemplary embodiment shown in FIG. 3 during a collision with a pedestrian.

FIG. 5 shows a schematic plan view of the exemplary embodiment shown in FIG. 3 during a collision with a pedestrian, of whom only one lee 19 is illustrated in FIG. 5. As a result of the collision with the pedestrian, the bumper cover 6 and the pedestrian protection element 11 are deformed deliberately in a manner coordinated with one another. In addition, the absorption element 14, and possibly further absorption elements 15 and 16 that are present, is displaced from its front absorption position into its rear release position such that forces are transferred to the pedestrian from the vehicle 2 only via the bumper cover 6 and the pedestrian protection element 11, in order to comply with pedestrian protection requirements.

Figure 6:
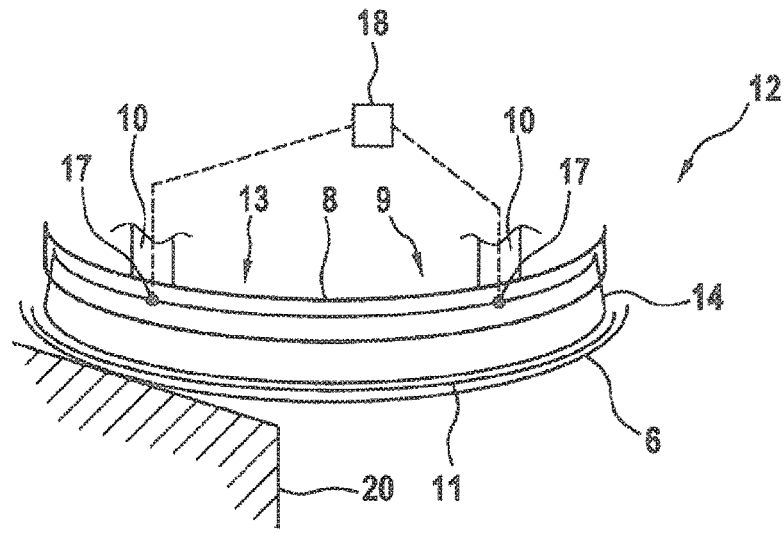
FIG. 6 is a schematic plan view of the exemplary embodiment shown in FIG. 3 immediately before a collision with a barrier.

FIG. 6 shows a schematic plan view of the exemplary embodiment shown in FIG. 3 immediately before a collision with a barrier 20. The locking devices 17 are in their locking states, and are thus activated by the electronic controller 18.

Figure 7:
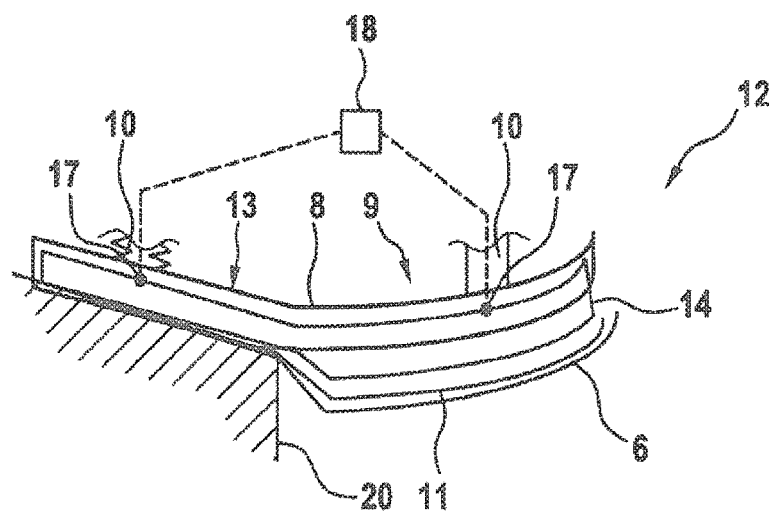
FIG. 7 is a schematic plan view of the exemplary embodiment shown in FIG. 3 during a collision with a barrier.

FIG. 7 shows a schematic plan view of the exemplary embodiment shown in FIG. 3 during a collision with the barrier 20. As a result of the collision with the barrier 20, the bumper cover 6, the pedestrian protection element 11, the absorption element 14, the cross member 8 and the deformation element 10 shown on the left are deformed deliberately in a manner coordinated with one another.

LIST OF REFERENCE SIGNS

1 Bumper system
2 Vehicle
3 Hood
4 Radiator grille
5 Engine side member
6 Bumper cover
7 Pedestrian protection device
8 Cross member
9 Bumper
10 Deformation element
11 Pedestrian protection element
12 Bumper system
13 Arrangement
14 Absorption element
15 Absorption element
16 Absorption element
17 Locking device
18 Electronic controller
19 Leg
20 Barrier The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for absorbing kinetic energy acting on a front bumper of a vehicle, comprising:
   at least one pedestrian protection element that is arrangeable on a cross member of the bumper;
   at least one absorption element that is arrangeable on the cross member and is movable in a longitudinal direction of the vehicle relative to the cross member between a front absorption position and a rear release position; and
   at least one locking device which is arrangeable on the cross member and by which the at least one absorption element is temporarily lockable in its absorption position,
   wherein, in the absorption position, the absorption element is connected in parallel with the pedestrian protection element with regard to introduction of force into the bumper that is brought about by the kinetic energy.

2. The arrangement according to in claim 1, wherein the absorption element is less rigid than the cross member at least in a direction of the introduction of force.

3. The arrangement according to in claim 1, wherein at least two absorption elements are provided, wherein a first absorption element is arranged above the pedestrian protection element and a second further absorption element is arranged beneath the pedestrian protection element.

4. The arrangement according to claim 1, wherein at least two absorption elements are provided, wherein a first absorption element is arranged over or under the pedestrian protection element and a second absorption element is arrangeable in a region of an attachment of the cross member to a further component of the vehicle or of the bumper.

5. The arrangement according to claim 1, wherein the pedestrian protection element is formed at least partially of a foam material.

6. The arrangement according to claim 1, wherein the arrangement is for a motor vehicle.

7. A bumper system for a vehicle, comprising:
   at least one bumper arrangeable on a front of the vehicle, the bumper comprising a cross member and an arrangement that absorbs kinetic energy acting on the bumper;
   wherein the arrangement comprises:
   at least one pedestrian protection element that is arranged on the cross member of the bumper;
   at least one absorption element that is arranged on the cross member and is movable in a longitudinal direction of the vehicle relative to the cross member between a front absorption position and a rear release position; and
   at least one locking device which is arranged on the cross member and by which the at least one absorption element is temporarily lockable in its absorption position,
   wherein, in the absorption position, the absorption element is connected in parallel with the pedestrian protection element with regard to introduction of force into the bumper that is brought about by the kinetic energy.

8. The bumper system according to claim 7, wherein the absorption element is less rigid than the cross member at least in a direction of the introduction of force.

9. The bumper system according to claim 7, wherein at least two absorption elements are provided, wherein a first absorption element is arranged above the pedestrian protection element and a second further absorption element is arranged beneath the pedestrian protection element.

10. The bumper system according to claim 1, wherein at least two absorption elements are provided, wherein a first absorption element is arranged over or under the pedestrian protection element and a second absorption element is arrangeable in a region of an attachment of the cross member to a further component of the vehicle or of the bumper.

11. The bumper system according to claim 7, wherein the pedestrian protection element is formed at least partially of a foam material.

12. The bumper system according to claim 7, wherein the arrangement is for a motor vehicle.

13. The bumper system according to claim 7, further comprising:
   at least one electronic controller via which the locking device is actuable, wherein
   the electronic controller is set up to lock or unlock the locking device depending on a speed of the vehicle and detection by a sensor of an obstacle arranged in front of the vehicle.

14. The bumper system according to claim 13, wherein the electronic controller is set up to transfer the locking device exclusively from a release state in which the absorption element is not locked in its absorption position into a locking state in which the absorption element is locked in its absorption position, when:
   the vehicle is in a parked state,
   the vehicle is in a speed range of 0 km/h to 20 km/h when first started,
   the vehicle has reverse gear engaged or is idling, subsequently to being first started,
   the vehicle is moving at a speed in a range of 0 km/h to 20 km/h and at the same time an obstacle is detected in front of the vehicle,
   the vehicle is moving at a speed in a range of 55 km/h to 80 km/h and at the same time an obstacle is detected in front of the vehicle, and/or
   the vehicle is moving at a speed in the range of 80 km/h to a maximum vehicle speed.

15. The bumper system according to claim 14, wherein the electronic controller is set up to detect the state of the locking device.

16. The bumper system according to claim 13, wherein the electronic controller is set up to detect the state of the locking device.

17. The bumper system according to claim 13, further comprising:
   at least two deformation elements via which the cross member is connected to further components of the vehicle.

\* \* \* \* \*